United States Patent [19]

Howard

[11] 4,206,893

[45] Jun. 10, 1980

[54] SEAL CLOSURE FOR SLOT IN ENGINE MOUNTING STRUT

[75] Inventor: Philip Howard, Edmonds, Wash.

[73] Assignee: The Boeing Company, Seattle, Wash.

[21] Appl. No.: 946,118

[22] Filed: Sep. 27, 1978

[51] Int. Cl.$^2$ .............................................. B64D 27/00
[52] U.S. Cl. ...................................... 244/54; 60/232;
    239/265.31; 244/110 B; 248/554
[58] Field of Search ............ 244/54, 46, 110 B, 129.5,
    244/130; 60/39.31, 226 A, 230, 232; 248/554;
    239/265.11, 265.13, 265.31, 265.33; 49/69, 73,
    114; 181/215, 216

[56] References Cited

U.S. PATENT DOCUMENTS

| | | | |
|---|---|---|---|
| 3,059,426 | 10/1962 | Laucher et al. | 239/265.31 |
| 3,175,791 | 3/1965 | Toms | 244/130 |
| 3,356,317 | 12/1967 | Bird | 244/46 |
| 3,481,562 | 12/1969 | Deplante | 244/46 |
| 3,645,477 | 2/1974 | Kratschmar et al. | 244/46 |
| 3,680,815 | 8/1972 | Deplante | 244/46 |
| 3,797,784 | 3/1974 | Muller | 244/46 |
| 3,820,719 | 6/1974 | Clark | 60/226 A X |

*Primary Examiner*—Barry L. Kelmachter
*Attorney, Agent, or Firm*—Christensen, O'Connor, Johnson & Kindness

[57] ABSTRACT

A slot seal closure apparatus for use in an aircraft engine mounting strut comprises at least one door which covers a slot formed in the strut to accommodate fore/aft movement of a portion of the engine cowl. When the engine is in a cruise mode, the movable portion of the cowl is in its forwardmost position disengaged from the slot and the door is in a first position covering the slot so as to prevent airflow through the slot. When the engine is placed in a reverse mode, the movable portion of the cowl moves aft and the door swings to a second position spaced from the slot in reaction to the aft movement of the cowl portion so as to expose the slot thereby enabling the movable portion of the cowl to engage the slot.

12 Claims, 5 Drawing Figures

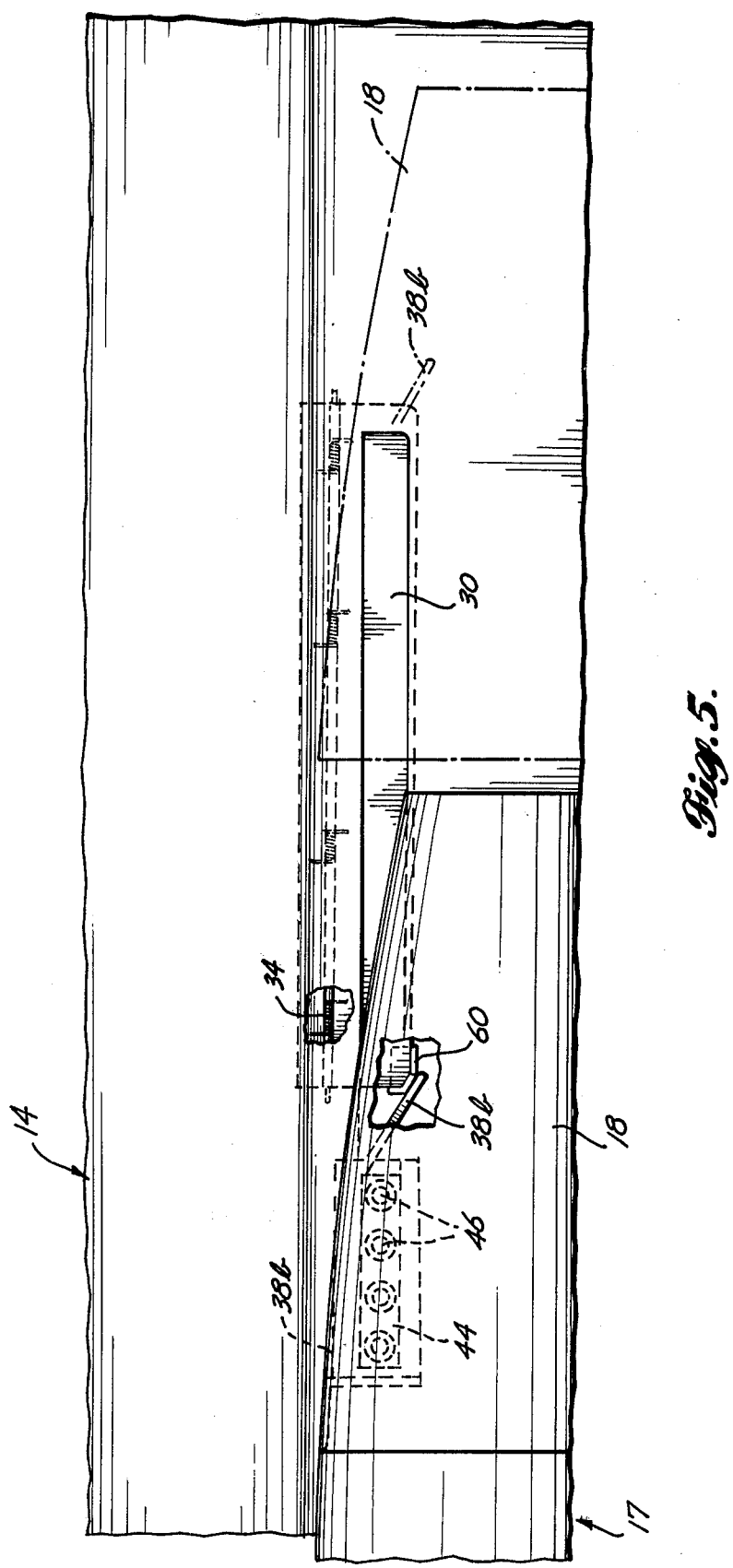

SEAL CLOSURE FOR SLOT IN ENGINE MOUNTING STRUT

BACKGROUND OF THE INVENTION

This invention relates to slot seal closures and more particularly to closures for a slot in an engine mounting strut of an aircraft.

In certain types of jet aircraft engines, a portion of the engine cowl moves fore and aft when the engine makes the transition from the cruise (forward thrust) mode to the reverse (reverse thrust) mode. In order to allow the portion of the cowl to move, a slot is formed in the mounting strut to receive the cowl portion as it moves aft. When the engine is in the cruise mode and the cowl portion is in the forwardmost position, the slot in the strut is open and provides a path for the airflow transverse to the path of flight of the aircraft. The transverse flow or crossflow causes a drag on the aircraft in flight affecting the efficiency of operation. It is therefore desirable to close the slot during flight.

Prior attempts to close the slot when the engine was in the cruise mode have used doors which were powered from an external means. These closure methods were complicated to install and to maintain and also added significant additional weight to the aircraft.

It is therefore an object of the present invention to provide a slot seal closure which covers the slot when the engine is in the cruise mode and uncovers the slot when the engine is in a reverse mode.

It is a further object of this invention to provide a door which covers the slot when the engine is in the cruise mode and which opens in response to aft movement of a portion of the engine cowl so as to allow the cowl portion to enter the slot.

It is yet another object of this invention to provide such a door of relatively simple and inexpensive construction and which requires no external means of actuation other than the movement of the cowl portion.

It is another object of this invention to provide a slot seal closure apparatus which is lightweight and does not significantly add to the weight of the aircraft.

SUMMARY OF THE INVENTION

In accordance with the foregoing objects, the present invention provides an improved closure apparatus for blocking a slot formed in the engine mounting strut used to mount a jet engine on an aircraft. The engine includes a cowl, at least a portion of which is movable between a forward position and an aft position spaced from the forward position. The slot in the mounting strut is provided for the purpose of receiving the movable cowl portion as it moves from its forward to its aft position. The improved apparatus for blocking the slot comprises a door and first means for mounting the door on the strut adjacent the slot for swinging movement of the door between a first position and a second position. When the movable portion of the cowl is in its forward position, the door is in its first position blocking the slot. In the second position, the door is spaced from the slot. Second means are provided associated with the door and the movable cowl portion for urging the door from its first position to its second position in reaction to the movement of the cowl portion from its forward position to its aft position.

In a preferred embodiment, the slot closure apparatus also includes a biasing means associated with the door for biasing the door toward its first position.

BRIEF DESCRIPTION OF THE DRAWINGS

The foregoing objects and advantages of the present invention will be readily apparent to those skilled in the art and others upon reading the following specification when taken in conjunction with the drawings, wherein:

FIG. 5 is a side elevational view of the slot seal closure apparatus of FIG. 2 with portions removed.

DETAILED DESCRIPTION OF THE PREFERRED EMBODIMENT

Figure 1:
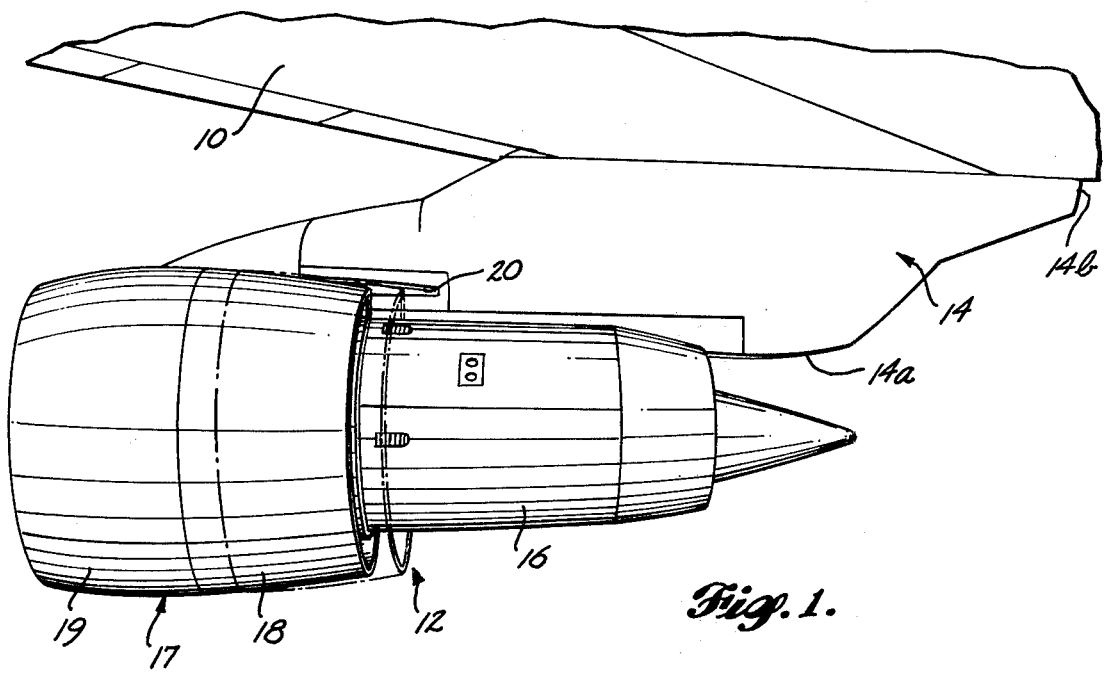
FIG. 1 is a side-elevational view of a jet aircraft engine mounted below the wing of a jet aircraft.
Figure 2:
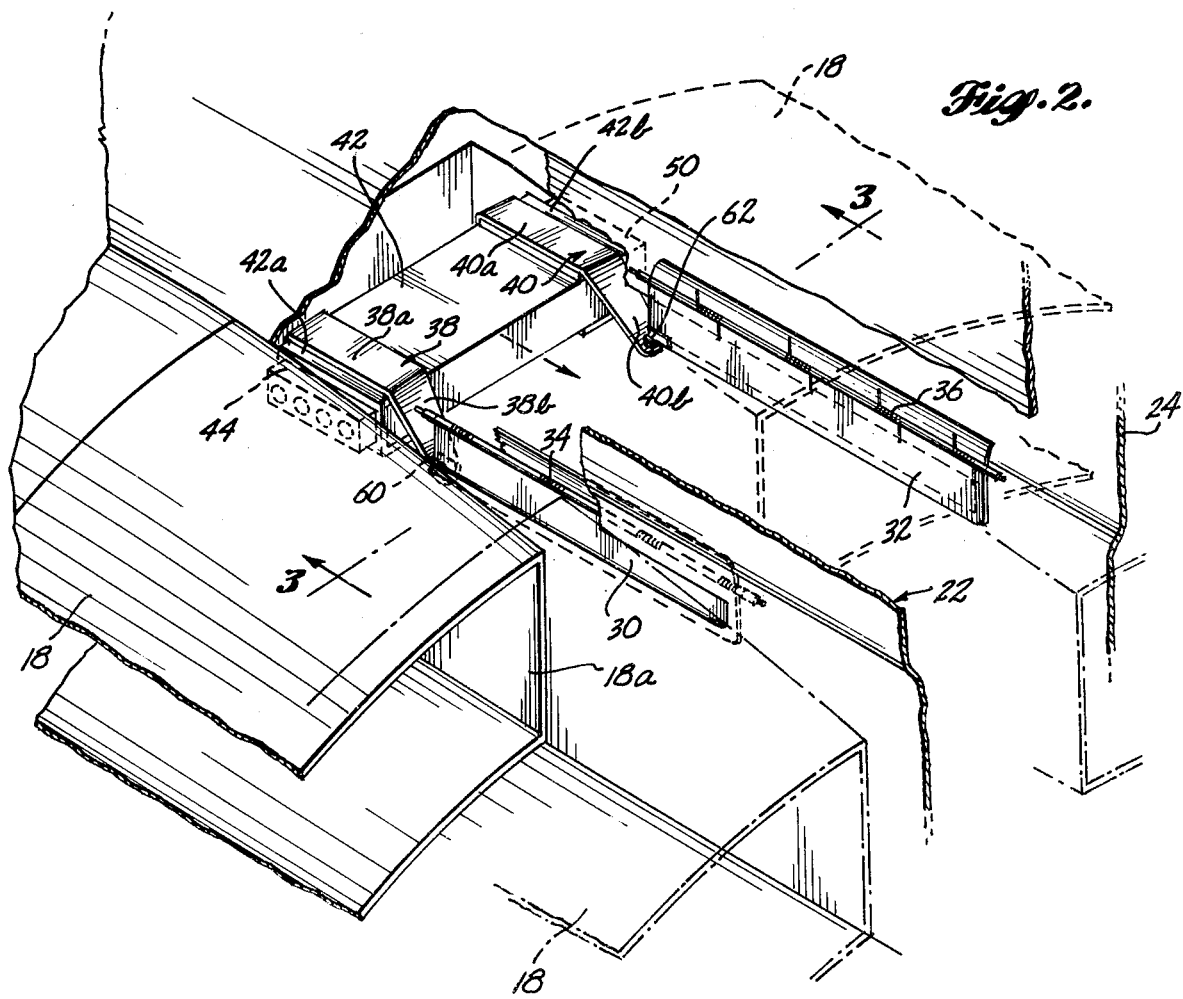
FIG. 2 is a isometric view with portions removed of an engine having a slot seal closure apparatus constructed in accordance with the principles of this invention installed thereon.

Referring to FIG. 1, an aircraft wing has a jet engine 12 mounted on its underside. The engine 12 is fixed to a lower end 14a of an engine strut 14. An upper end 14b of the engine strut is affixed to the exterior bottom surface of the wing 10. The longitudinal axis of the engine 12 is substantially parallel to the fore/aft axis of the aircraft (not shown).

The engine 12 includes a cylindrical main body portion 16 and a cylindrical cowl 17. The cowl is concentric with the main body 16 and the diameter of the cowl is larger than the diameter of the main body such that the cowl surrounds and overlies a portion of the main body 16. The cowl 17 extends axially a shorter distance than the main body 16. The cowl 17 includes an aft portion 18 and a forward portion 19. Both portions 18 and 19 are substantially annular and the aft portion 18 is movable between a forward position in which a forward edge of the aft portion 18 abuts an aft edge of the forward portion 19 and an aft position in which the forward edge of the aft portion 18 is spaced from the aft edge of the forward portion 19.

When the engine 12 is in a cruise mode, the thrust is in a direction aft and the movable portion 18 of the engine cowl is located in its forwardmost position relative to the main body 16. The solid outline drawing of FIG. 1 shows the cowl portion 18 in its forwardmost position with the engine in the cruise mode. The engine will normally be in the cruise mode when the aircraft is taking off or is in flight.

Upon landing, the pilot will wish to slow the speed of the plane as soon as it has touched down. The engine is then "reversed". The cowl portion 18 moves axially aft as shown by the broken line drawing in FIG. 1 to form a substantially annular opening between the fixed and movable portions of the cowl 17, thereby exposing a series of buckets or turning vanes (not shown) in the engine main body. The buckets or turning vanes reverse the flow of air through the engine thereby directing the thrust of the engine forward and slowing the plane.

In order to allow the movable cowl portion 18 to move from its forwardmost position aft to its reverse position, it is necessary to provide a slot 20 in the engine strut 14. The slot 20 is elongate and has its long dimension substantially parallel to the fore/aft axis of the aircraft. The slot is located near the lower end 14a of the engine adjacent the movable cowl portion 18. The slot 20 is oriented such that the aft edge of the cowl portion 18 is within the forward portion of the slot 20 when the engine is in the cruise mode and the cowl portion 18 is in its forwardmost position. The slot 20 extends aft from the engine cowl a distance substantially equal to the magnitude of the aft movement of the cowl portion 18 when the engine is reversed.

When the aircraft is cruising with the cowl portion 18 in its forwardmost position, the slot 20 provides a path for airflow transverse to the path of flight of the aircraft. Due to the pressure differentials built up by the configuration of the wing and engines, the flow will be from the outboard side of the engines through the slot 20 toward the body of the aircraft. The transverse airflow through the slot 20 causes an increase in the drag of the aircraft and thereby decreases fuel efficiency.

FIGS. 2-5 illustrate an apparatus made in accordance with principles of this invention for sealing the slot 20 when the engine is in the cruise mode so as to eliminate the crossflow through the slot and decrease the resultant drag on the aircraft. The apparatus further is constructed so as to open the slot 20 when the engine is reversed to allow the cowl portion 18 to be received in the slot, as it moves aft.

Figure 3:
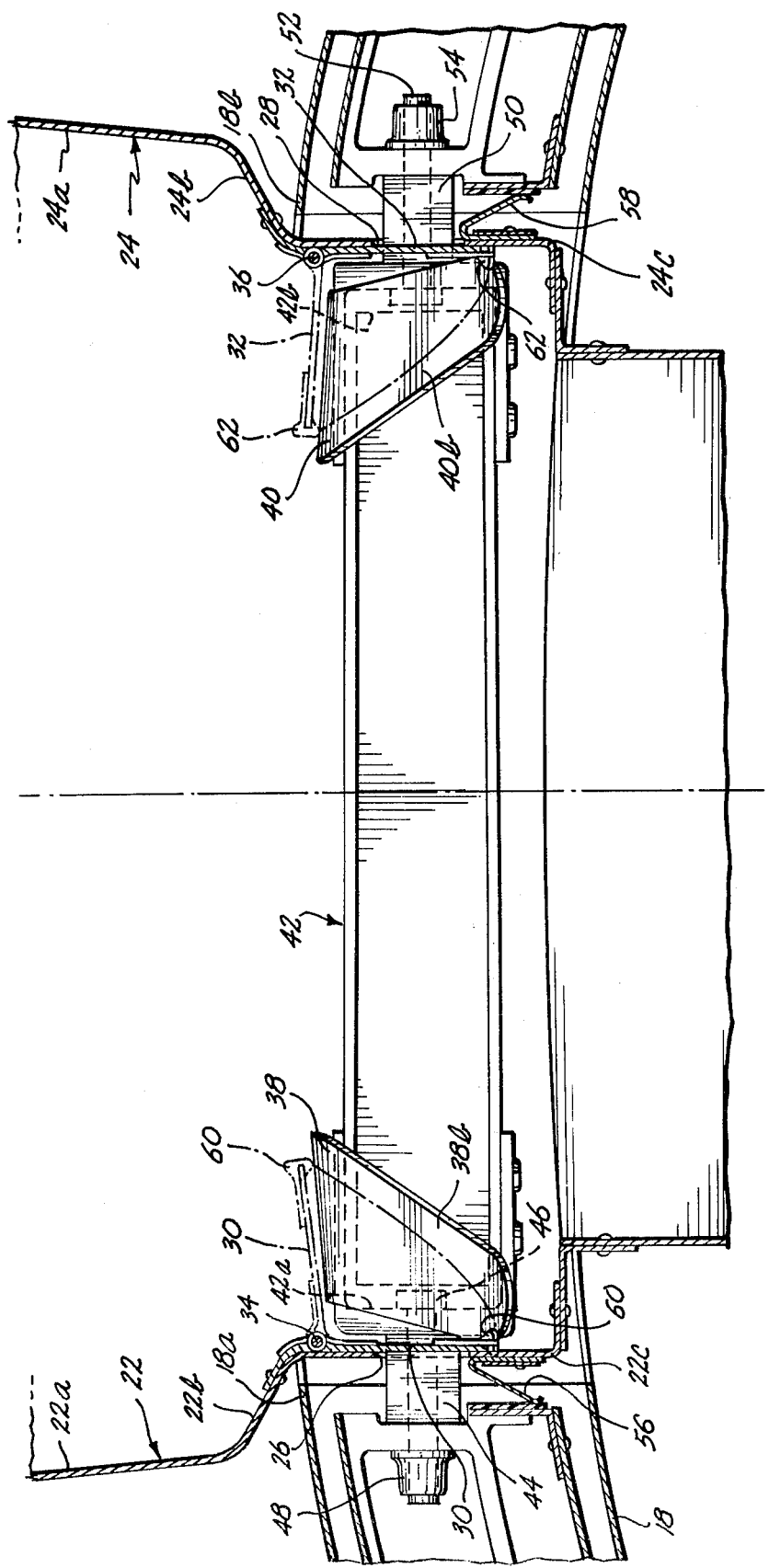
FIG. 3 is a sectional view along line 3—3 of FIG. 2.
Figure 4:
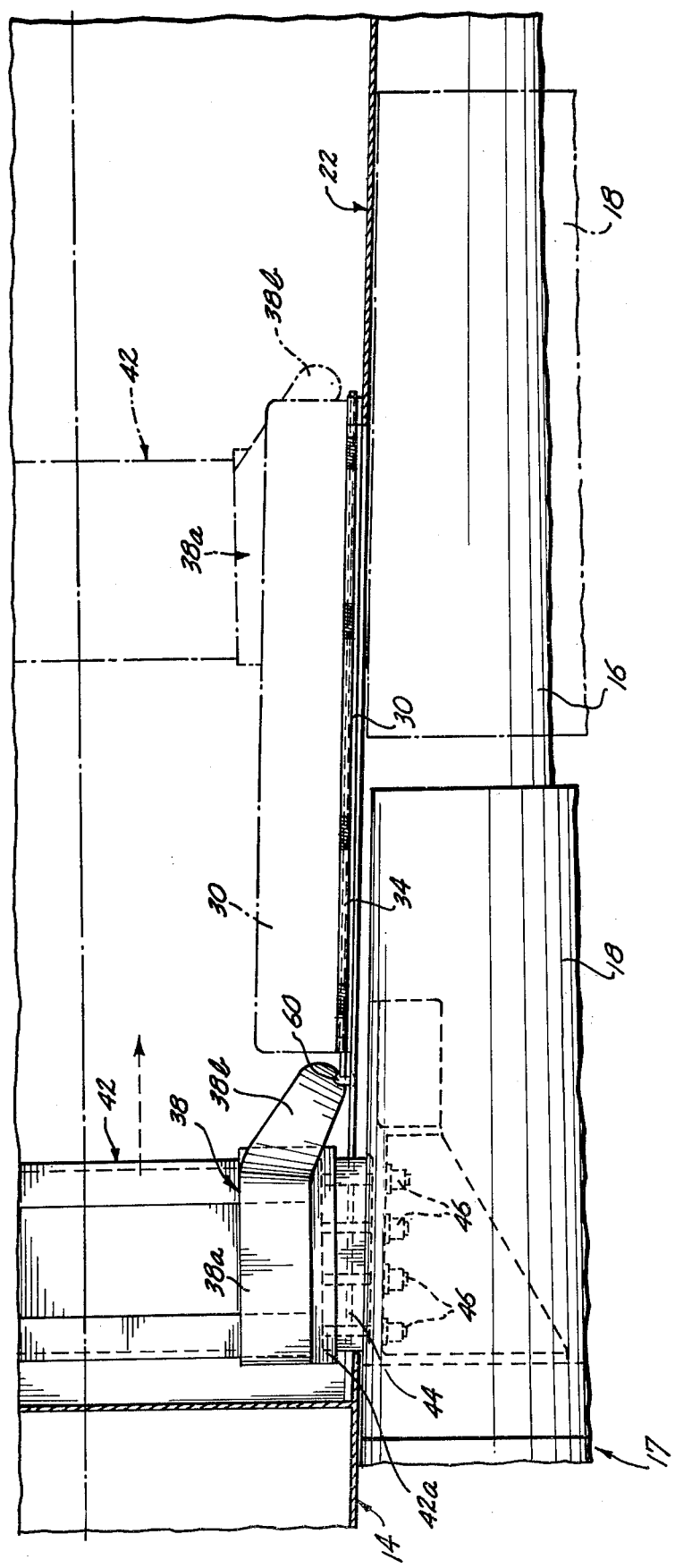
FIG. 4 is a plan view partly in section of the slot seal closure apparatus shown in FIG. 2.

As best seen in FIG. 3, the engine strut 14 comprises two spaced sidewalls 22 and 24. The sidewalls 22 and 24 have planar portions 22a and 24a, respectively, which extend from the underside of the wing 10 downwardly in substantially parallel relation. At a point adjacent the engine 12, the sidewalls curve inwardly and extend toward one another forming nonparallel portions 22b and 24b, respectively. The sidewalls then extend downwardly again in substantially parallel spaced relation forming terminal portions 22c and 24c, respectively. The slot 20 extends laterally through the lower end 14a of the engine strut 14 thereby necessitating the openings 26 and 28, respectively, be formed in the terminal portions 22c and 24c of the sidewalls 22 and 24. In order to completely seal the slot 20 from the crossflow it is therefor necessary to block both of the openings 26 and 28.

A first door 30 is swingably mounted on the sidewall 22 adjacent to and blocking the opening 26. The first door 30 is free to swing upwardly about its upper edge from a first position blocking the opening 26 to a second position oriented approximately 90 degrees from the first position and spaced from the opening 26. Similarly, a second door 32 is mounted adjacent the opening 28 and is free to swing about its upper edge between a first position adjacent to and blocking the opening 28 and a second position oriented approximately 90 degrees from the first position and spaced from the opening 28.

The first door 30 is attached to the sidewall 22 by means of a hinge 34 mounted between the first door and the sidewall. One side of the hinge 34 is attached to the sidewall 22 adjacent the junction of a nonparallel portion 22b and the terminal portion 22c. The other side of the hinge 34 is attached to the first door 30 adjacent the upper edge thereof. The hinge 34 extends the entire length of the first door 30 and is spring-loaded so as to bias the first door toward its closed position blocking the opening 26. An identical second hinge 36 is used to mount the second door 32 to the inboard sidewall 24.

The movable portion 18 of the engine cowl 17 is longitudinally bifurcated at its topmost extent. A tension box 42 is mounted between the first and second ends 18a and 18b, respectively formed by the bifurcation of the movable cowl portion 18. The tension box 42 is substantially a rectangular parallelepiped and is oriented with its longest dimension tangent to the circumference of the cowl 18. The tension box 42 is positioned just forward of the doors 30 and 32 when the cowl is in its forwardmost position. Since the tension box 42 provides the structural link between the first and second ends 18a and 18b of the movable portion 18 of the cowl 17, it is necessary that the tension box 42 be constructed so as to be able to withstand the large hoop stresses directed circumferentially around the cowl and which are present in the cowl during flight. The tension box 42 has an outboard extension 44 extending from the outboard end wall 42a of the tension box. The extension is of an outside dimension smaller than the dimensions of the tension box. The outboard end of the extension 44 abuts the first end 18a of the cowl portion 18. A series of bolts 46 pass through the outboard end wall 42a of the tension box, the outboard extension 44 and the first end 18a of the cowl. The bolts are secured by associated nuts 48 which are turned onto the bolts thereby attaching the outboard end wall 42a of the tension box 42 to the cowl portion 18. Similarly, an inboard extension 50 extends from the inboard end wall 42b of the tension box and abuts the second end 18b of the cowl. The inboard end of the tension box is attached to the second end 18b of the cowl by a series of bolts 52 which pass through the inboard end wall 42b of the tension box, the inboard extension 50 and the second end 18b of the cowl. The bolts are secured by associated nuts 54 threaded thereon. To prevent airflow between the ends of the bifurcated cowl portion 18 and the engine strut 14, a seal member 56 is affixed between the first end 18a of the cowl portion and the terminal portion 22c of the outboard strut sidewall 22 at a location just below the opening 26. An identical seal member 58 is affixed between the second end 18b of the cowl portion 18 and the terminal portion 24c of the inboard strut sidewall 24 just below the opening 28.

The mechanism which moves the first and second doors 30 and 32 from their first to their second positions as the cowl portion 18 moves aft from its forwardmost (cruise) position to its aftmost (reverse) position includes a pair of high gain cam members 38 and 40 which respectively contact the lower edge of the first and second doors 30 and 32. The cam members 38 and 40 are affixed to the movable portion 18 of the cowl 17 and move aft with the cowl portion 18. As the cowl portion 18 moves aft, the bottom edges of the doors ride up the upper surface of the cam members 38 and 40. The upper surfaces of each of the cam members 38 and 40 are contoured to match the arc described by the forward lower edge of the associated door as it moves from its first to its second position. Thus, the cams as they move aft, urge the doors to swing to the second position independent of any external motive means such as a motor or hydraulic system. The movement of the doors is solely dependent upon the fore/aft movement of the cam surfaces 38 and 40 which in turn is solely dependent upon the fore-aft movement of the cowl portion 18.

The first and second cam members 38 and 40 are affixed to the tension box 42. The first cam member 38 comprises a first rectangular portion 38a which is affixed to the top wall of the tension box 42 adjacent its outboard end wall 42a. An angled portion 38b extends aft and downwardly from the rectangular portion 38a to a position just below the forward lower corner of the first door 30. Similarly, the second cam member 40 includes a first portion 40a affixed to the top wall of the tension box 42 adjacent the inboard end wall 42b. An angled portion 40b extends aft and downwardly from the rectangular portion 40a to a location just below the forward lower corner of the second door 32.

As stated above, the forward lower corners of the doors 30 and 32 abut the upper surfaces of the associated cam members 38 and 40. The upper surfaces of the cam members are contoured in both the inboard/outboard direction and the fore/aft direction to correspond to the arc described by the lower corner of the door as it swings from the first to the second position. The contour results in the upper surfaces of both cam members having a slope which rises from the strut sidewalls to the interior of the strut. Thus, as the cowl portion 18 moves toward its aft (reverse) position, the tension box 42 and the cam members 38 and 40 affixed thereto also move aft. As the cam members move aft, the lower edges of the doors ride up the contoured upper surfaces of the associated cam member and the doors swing to their second positions exposing the openings 26 and 28 and allowing the cowl portion 18 to move aft and occupy the slot 20. A rub strip 60 is affixed to the lower edge of the door 30 along its length. The rub strip 60 contacts the cam member 38 and provides a reduced friction between the lower edge of the door 30 and the cam member as the door moves across the cam member upper surface. Similarly, a rub strip 62 is affixed to the lower edge of the second door 32 and contacts the upper surface of the cam member 40.

When the engine 12 is placed back in the cruise mode, the cowl portion 18 moves back to its forwardmost position and the spring-loaded hinges 34 and 36 urge the doors 30 and 32 toward their first positions blocking the slot 20.

In summary therefore, an apparatus has been described for closing a slot in the engine mounting strut of a jet aircraft. The slot is formed for the purpose of accepting a portion of the cowl on the jet engine as the cowl portion moves aft when the engine is placed in the reverse mode. The apparatus includes doors which cover the slot when the engine is in the cruise mode and the cowl portion is in its forwardmost position. The doors prevent the crossflow of air through the slot when the engine is in the cruise mode which in turn improves the fuel efficiency of the aircraft. The doors are urged to an open position as the cowl portion moves aft by associated cam members affixed to the cowl portion thereby opening the slot and allowing the cowl portion to be received into the slot as the cowl portion moves aft. The doors are actuated solely by means of the rearward movement of the cowl portion without the use of any external means such as motors or hydraulic systems.

It is to be understood by those skilled in the art and others that while a preferred embodiment of the slot seal closure of the present invention has been described and illustrated, it is possible to make changes in the structure of the closure mechanism while remaining within the spirit and scope of the present invention as defined in the claims below. For example, although in the illustrated embodiment, the doors 30 and 32 move toward the interior of the strut when opening, it is possible to construct the cam members so that the doors will move away from the strut when opening. Also, although the tension box 42 is described as a rectangular solid and is secured to the cowl by bolts, it is possible to use tension boxes of other than rectangular shape and to secure them by means other than bolts, for example, welding or riveting. The only consideration is that the tension box and attachment means must have sufficient structural strength to withstand the hoop stresses which occur in the cowl when the aircraft is in flight so as to prevent the hoop stresses from separating the tension box from the cowl or rupturing the tension box itself.

The embodiments of the invention in which an exclusive property or privilege is claimed are defined as follows:

1. In a jet aircraft having an engine, on a strut, the engine having a cowl and at least a portion of the cowl being translatable between a forward position and an aft position spaced from said forward position, the strut having a slot formed therein for receiving the translatable portion of the cowl as the cowl portion translates from said forward position to said aft position, an improved apparatus for blocking said slot when said cowl portion is in said forward position comprising:
   a door;
   first means for mounting said door on said strut adjacent said slot for swinging movement of said door about an axis substantially parallel to the direction of translation of said cowl portion between a first position in which said door blocks said slot and a second position wherein said door is spaced from said slot;
   second means associated with said door and mounted to said cowl for transforming the translational movement of said cowl portion into swinging movement of said door so that said door swings from said first position to said second position in reaction to the translation of said cowl portion from said forward position to said aft position.

2. The improved apparatus of claim 1 further comprising:
   biasing means associated with said door for biasing said door toward said first position.

3. The apparatus of claim 1 wherein said first means comprises a spring-loaded hinge.

4. In an aircraft having a jet engine mounted thereon, the engine having a cowl, said cowl having a first portion and a second portion, the second portion of said cowl being translatable between a forward position adjacent said first portion and an aft position spaced from said first portion, the engine being mounted on a strut, the strut including first and second spaced vertical planar members, said first and second planar members each containing a first and second opening respectively, said second portion of said cowl being received in said first and second openings of said strut as said second portion translates to said aft position, an apparatus for blocking the passage of air through said first and second openings when said second portion of said cowl is in said forward position comprising:
   a first door panel movably mounted on said first planar member adjacent said first opening for swinging movement of said first door panel about an axis substantially parallel to the direction of translation of said second cowl portion between a first position in which said door panel blocks said opening and a second position spaced from said first position;
   a second door panel movably mounted on said second planar member adjacent said second opening for swinging movement of said second door panel about an axis substantially parallel to the direction of translation of said second cowl portion between a first position wherein said second door panel blocks said second opening and a second position spaced from said first position;

first means mounted to said second portion of said cowl and said first and second door panels for transforming the translational movement of said second cowl portion into swinging movement of said first and second door panels so that said first and second door panels swing from their respective first positions toward their respective second positions in response to translation of said second portion of said cowl from said forward position toward said aft position.

5. The apparatus of claim 4 further including first biasing means associated with said first door panel and said first planar member for urging said first door panel toward said first position and second biasing means associated with said second door panel and said second planar member for urging said second door panel toward said first position.

6. The apparatus of claim 5 wherein said first and second biasing means comprise spring-loaded hinges.

7. In a jet aircraft having an engine on a strut the engine having a cowl and at least a portion of the cowl being movable between a forward position and an aft position spaced from said forward position, the strut having a slot formed therein for receiving the movable portion of the cowl as the cowl portion moves from said forward position to said aft position, an improved apparatus for blocking said slot when said cowl portion is in said forward position comprising:

a door;

first means for mounting said door on said strut adjacent said slot for swinging movement of said door between a first position in which said door blocks said slot and a second position wherein said door is spaced from said slot; and second means associated with said door and said cowl for urging said door from said first position to said second position in reaction to the movement of said cowl portion from said forward position to said aft position, said second means including a cam affixed to said cowl portion and positioned such that a bottom edge of said door abuts said cam, the upper surface of said cam being contoured such that as said cowl portion moves toward said aft position the bottom edge of said door rides on the upper surface of said cam so as to cause said door to move from said first position to said second position.

8. The apparatus of claim 7 further including biasing means associated with said door for biasing said door toward said first position.

9. The apparatus of claim 7 wherein said first means comprises a spring-loaded hinge.

10. In an aircraft having a jet engine mounted thereon the engine having a cowl, said cowl having a first portion and a second portion, the second portion of the cowl being movable between a forward position adjacent said first portion and an aft position spaced from said first portion, the engine being mounted on a strut, the strut including first and second spaced vertical planar members, said first and second planar members each containing a first and second opening, respectively, said second portion of said cowl being received in said first and second openings of said strut as said second portion moves to said aft position, an apparatus for blocking the passage of air through said first and second openings when said second portion of said cowl is in said forward position comprising:

a first door panel movably mounted on said first planar member adjacent said first opening for swinging movement of said first door panel between a first position in which said door panel blocks said opening and a second position spaced from said first position;

a second door panel movably mounted on said second planar member adjacent said second opening for swinging movement of said second door panel between a first position wherein said second door panel blocks said second opening and a second position spaced from said first position; and first means associated with said second portion of said cowl and said first and second door panels, said first means including first and second cam members affixed to said second portion of said cowl, each of said first and second cam members having a contoured upper surface contacting the first and second door panels respectively such that as said second portion of said cowl and said cam members move aft, the first and second door panels remain in contact with the upper surfaces of their associated cam members so as to move said first and second door panels from their first position to their second position.

11. The apparatus of claim 10 further including first biasing means associated with said first door panel and said first planar member for urging said first door panel toward said first position and second biasing means associated with said second door panel and said second planar member for urging said second door panel toward said first position.

12. The apparatus of claim 11 wherein said first and second biasing means comprise spring-loaded hinges.

* * * * *

UNITED STATES PATENT AND TRADEMARK OFFICE
CERTIFICATE OF CORRECTION

PATENT NO. : 4,206,893
DATED : June 10, 1980
INVENTOR(S) : Howard, Phil

It is certified that error appears in the above-identified patent and that said Letters Patent are hereby corrected as shown below:

Column 7, line 5; insert "cooperable with" before "said".

Signed and Sealed this

Ninth Day of September 1980

[SEAL]

Attest:

SIDNEY A. DIAMOND

Attesting Officer          Commissioner of Patents and Trademarks